US012610444B2

(12) United States Patent
Li et al.

(10) Patent No.: US 12,610,444 B2
(45) Date of Patent: Apr. 21, 2026

(54) SMART LAMP, METHOD FOR TURNING ON SMART LAMP, AND METHOD FOR TRANSFERRING, LOADING, AND APPLYING LAMP STATE MODEL

(71) Applicant: ANDON HEALTH CO., LTD., Tianjin (CN)

(72) Inventors: Qin Li, Tianjin (CN); Fei Zhang, Tianjin (CN); Yang Guo, Tianjin (CN)

(73) Assignee: ANDON HEALTH CO., LTD., Tianjin (CN)

( * ) Notice: Subject to any disclaimer, the term of this patent is extended or adjusted under 35 U.S.C. 154(b) by 462 days.

(21) Appl. No.: 18/038,447

(22) PCT Filed: Nov. 12, 2021

(86) PCT No.: PCT/CN2021/130213
§ 371 (c)(1),
(2) Date: May 24, 2023

(87) PCT Pub. No.: WO2022/111302
PCT Pub. Date: Jun. 2, 2022

(65) Prior Publication Data

US 2024/0015872 A1 Jan. 11, 2024

(30) Foreign Application Priority Data

Nov. 24, 2020 (CN) ........................ 202011334757.6

(51) Int. Cl.
*H05B 47/165* (2020.01)
*H05B 45/20* (2020.01)
(Continued)

(52) U.S. Cl.
CPC ........... *H05B 47/165* (2020.01); *H05B 47/19* (2020.01); *H05B 45/20* (2020.01); *H05B 47/155* (2020.01)

(58) Field of Classification Search
CPC ...... H05B 47/165; H05B 47/19; H05B 45/20; H05B 47/155
See application file for complete search history.

(56) References Cited

U.S. PATENT DOCUMENTS

2011/0305200 A1* 12/2011 Schoofs .............. H05B 47/196
370/328
2015/0160623 A1* 6/2015 Holley ............ H04N 21/43615
700/90
(Continued)

FOREIGN PATENT DOCUMENTS

CN 106604508 A 4/2017
CN 106912150 A 6/2017
(Continued)

*Primary Examiner* — Kenneth M Lo
*Assistant Examiner* — Zachary Andrew Cain
(74) *Attorney, Agent, or Firm* — Bayramoglu Law Offices LLC

(57) ABSTRACT

A smart lamp, a method for turning on the smart lamp, and a method for transferring, loading, and applying a lamp state model are provided. The smart lamp can extract a lamp state model locally and apply the lamp state model. The smart lamp includes a smart lamp body and a lamp module, a lamp state model memory module, a lamp state model calculation module, and a lamp state model application module that are arranged in the smart lamp body. The lamp module is a lighting device capable of recording and controlling a lamp state. The lamp state model memory module is configured to store the generated lamp state model. The lamp state model calculation module is configured to calculate the lamp state model. The lamp state model application module is configured to call the lamp state model from the lamp state model memory module and apply the lamp state.

4 Claims, 3 Drawing Sheets

(51) Int. Cl.
*H05B 47/155* (2020.01)
*H05B 47/19* (2020.01)

(56) References Cited

U.S. PATENT DOCUMENTS

| | | | | |
|---|---|---|---|---|
| 2015/0296594 | A1* | 10/2015 | Blum | H05B 45/20 315/158 |
| 2017/0074536 | A1* | 3/2017 | Bentz | G05B 19/042 |
| 2018/0080669 | A1* | 3/2018 | Corcoran | F24F 11/62 |
| 2018/0132199 | A1* | 5/2018 | Zhang | H04W 56/0065 |
| 2019/0045475 | A1* | 2/2019 | Kasichainula | G05B 19/0423 |
| 2020/0265835 | A1* | 8/2020 | Ni | G06N 3/006 |
| 2021/0199328 | A1* | 7/2021 | Venkatesh | G05B 13/048 |

FOREIGN PATENT DOCUMENTS

| | | | |
|---|---|---|---|
| CN | 107504656 | A | 12/2017 |
| CN | 109814938 | A | 5/2019 |
| CN | 110691441 | A | 1/2020 |
| CN | 111143369 | A | 5/2020 |
| CN | 111325380 | A | 6/2020 |
| CN | 112417696 | A | 2/2021 |

* cited by examiner

SMART LAMP, METHOD FOR TURNING ON SMART LAMP, AND METHOD FOR TRANSFERRING, LOADING, AND APPLYING LAMP STATE MODEL

CROSS REFERENCE TO THE RELATED APPLICATIONS

This application is the national phase entry of International Application No. PCT/CN2021/130213, filed on Nov. 12, 2021, which is based upon and claims priority to Chinese Patent Application No. 202011334757.6, filed on Nov. 24, 2020, the entire contents of which are incorporated herein by reference.

TECHNICAL FIELD

The present invention relates to the field of smart lighting lamps, in particular to a smart lamp, a method for turning on the smart lamp, and a method for transferring, loading, and applying a lamp state model.

BACKGROUND

An existing smart lighting lamp often uses maximum brightness, fixed brightness, previous brightness, or manually set brightness as turn-on brightness thereof, and a user often also needs to perform secondary adjustment according to a brightness requirement at a current time.

The existing smart lighting lamp capable of learning artificial intelligence (AI) models for lamp states such as the brightness and a color temperature often relies on a large amount of historical brightness data and has certain requirements for storage and computing resources. Therefore, a learning process is often carried out on a server or cloud, to support data storage and computing.

The deployment of lamp state AI learning on the server or cloud is susceptible to the network state quality (delay, interruption, and bandwidth limitation), thus affecting the accuracy of raw data and a lamp state model and the real-time property of model update.

In an existing method for carrying out the learning process on the smart lamp, a habit result within a fixed time period specified manually in general is calculated through long-time data accumulation, and a habit model obtained by such method has long learning time and lower accuracy as the time resolution and accuracy thereof are influenced by manual setting of the time period.

SUMMARY

To solve the problems that a smart lamp needs to learn on a server or cloud and has long learning time and lower accuracy in the prior art, the present invention provides a smart lamp capable of extracting and updating the lamp state model in real time.

Another objective of the present invention is to provide a method for turning on the above smart lamp.

Yet another objective of the present invention is to provide a method for transferring, loading, and applying a lamp state model using relative time.

In this regard, the present invention adopts the following technical solution:

A smart lamp capable of extracting and updating a lamp state model in real time, the smart lamp being capable of extracting a lamp state model locally and applying the lamp state model, where the smart lamp includes a smart lamp body and a lamp module, a lamp state model memory module, a lamp state model calculation module, and a lamp state model application module that are arranged in the smart lamp body. The lamp module is a lighting device capable of recording and controlling a lamp state, and is capable of obtaining state data for each operation or change, where the state data includes a state value and state occurrence time; the lamp state model memory module is configured to store the generated lamp state model, where the lamp state model includes a state value axis and a time axis, a time range of the time axis is a multiple of a cycle of a lamp state usage habit, and the state occurrence time and the time axis are absolute or relative time; the lamp state model calculation module is configured to calculate the lamp state model; the lamp state model application module is configured to call the lamp state model from the lamp state model memory module and to apply the lamp state; and the lamp state model calculation module learns new state data of the lamp, updates the lamp state model, and stores the updated lamp state model in the lamp state model memory module, where a method for learning and updating the lamp state model includes:

1) calling, by the lamp state model calculation module, state data recorded by the lamp module for at least two operations;
2) calling, by the lamp state model calculation module, the lamp state model in the lamp state model memory module, and finding an update time period for the current model on the time axis of the lamp state model, where the update time period for the model is obtained by the called state occurrence time for the two operations; and
3) during the update time period for the model, if the lamp state model has a state value, calculating a weighted mean between a state value of a previous operation in the two operations and the state value of the current lamp state model, and taking a calculated result as a new state value of the model during the update time period; or if the lamp state model does not have a state value, taking a state value of a previous operation as a new state value of the model during the update time period.

The lamp state includes at least one of the brightness, a color temperature, and a color of the lamp, and the state value is expressed with a control parameter for light-emitting states of all or some of LED beads or combinations of the light-emitting states.

The cycle of the lamp state usage habit is one day or one week.

A method for turning on the above smart lamp, including the following steps:

1) finding a time point for a current lamp turn-on operation on a time axis of a lamp state model;
2) obtaining a predicted state of the current lamp turn-on operation according to a state value of the lamp state model at the time point, and if a predicted result of a current lamp turn-on state is not obtained or is zero, using a non-zero state value closest to current lamp turn-on time on the lamp state model; and
3) turning on or gradually turning on, according to the predicted state of the current lamp turn-on state, a lamp to be in the predicted state.

A method for transferring, loading, and applying a lamp state model using relative time, including the following steps:

s1: connecting a transferred device A to a storage device B in a wired or wireless manner;

s2: manually or automatically transferring a lamp state model from the transferred device A to the storage device B, and the transferred content includes:

(1) the lamp state model;

(2) a corresponding time point Tbulb1 on the lamp state model for a transfer time; and (3) a corresponding time point Tapp1 on the storage device B for the transfer time;

s3: connecting the storage device B to a target application device C in a wired or wireless manner;

s4: manually or automatically loading the lamp state model from the storage device B to the target application device C, and the loaded content comprises (1) the lamp state model, and (2) a corresponding time point Tbulb2 on the lamp state model for a loading time, wherein said corresponding time point Tbulb2 on the lamp state model for the loading time is calculated by the following formula on the storage device B via (a) the corresponding time point Tbulb1 on the lamp state model for the transfer time, (b) the corresponding time point Tapp1 on the storage device B for the transfer time, and (c) a corresponding time point Tapp2 on the storage device B for the loading time,:

$$Tbulb2=Tbulb1+(Tapp2-Tapp1);$$

or the loaded content includes (1) the lamp state model, (2) the corresponding time point Tbulb1 on the lamp state model for the transfer time, (3) the corresponding time point Tapp1 on the storage device B for the transfer time, and (4) a corresponding time point Tapp2 on the storage device B for a loading time, wherein said corresponding time point Tbulb2 on the lamp state model for the loading time is calculated by the following formula on the target application device C via (1) the corresponding time point Tbulb1 on the lamp state model for the transfer time, (2) the corresponding time point Tapp1 on the storage device B for the transfer time, and (3) the corresponding time point Tapp2 on the storage device B for the loading time:

$$Tbulb2=Tbulb1+(Tapp2-Tapp1); \text{ and}$$

s5: applying the newly loaded lamp state model to the target application device C, where the transferred device A and the target application device C are smart lamps capable of storing and applying the lamp state model with relative time.

In the above step s5, applying the newly loaded lamp state model includes the following steps:

s51: when the lamp state model is loaded, calculating a deviation AxisDis between the corresponding time point Tbulb2 on the lamp state model for the loading time and a corresponding system time point ST0 on the device C for the loading time, wherein $$AxisDis=Tbulb2-ST0;$$

s52: converting real-time system time ST of the device C to a time axis of the lamp state model, where $$\text{converted real-time system time } ST'=ST+AxisDis; \text{ and}$$

s53: when the lamp state model is applied, indexing a state value of the lamp state model by using the converted real-time system time ST'.

The above storage device B is a terminal device, a local server, or a cloud server with the storage capacity.

In the transferred content in step s2, (1) the lamp state model uses the relative time; (2) the corresponding time point Tbulb1 on the lamp state model for the transfer time is obtained from the transferred device A; and (3) the corresponding time point Tapp1 on the storage device B for the transfer time is obtained from the storage device B.

The state occurrence time and the time axis may be absolute or relative time. The relative time may be, for example, calculated based on a zero time when the lamp is powered on.

The present invention has the following beneficial effects:

1. The method for calculating the lamp state model in the present invention is simple and concise in calculation, and learning and application of the lamp state model may be deployed on the lamp with limited resources.
2. The smart lamp in the present invention has local lamp state AI learning and application functions in the absence of a gateway/cloud. Compared with learning and calculation on the server or cloud, the smart lamp has the better privacy and security. The smart lamp can be free from network delay or interruption limitation, such as raw data loss caused by power failure, packet loss, bandwidth limitation, etc.

The present invention may also be compatible with the server or cloud. Through a mobile phone, the gateway or other medium, the lamp state model may also be uploaded to the cloud to assist in data processing, so as to implement blended learning and application.

3. During the process for calculating the lamp state model for the smart lamp in the present invention, the operations of a user can be learned in real time in only one habit cycle (such as 1 day) without waiting for learning data in a plurality of habit cycles and can be applied, with high sensitivity, and the model can be automatically updated with the change in a habit of the user.
4. There is no need for human participation in the learning process, such as manual specifying of a learning time period, and the entire learning process is fully automatic.
5. The model has a high time resolution, which may reach 1 min or even 1 s.

DETAILED DESCRIPTION OF THE EMBODIMENTS

The technical solution of the present invention is described in detail below in conjunction with the accompanying drawings and the embodiments.

In the present invention, a lamp state model includes a state value axis and a time axis of a lamp state, a time range of the time axis is a multiple of a cycle of a lamp state usage habit, and a state value is expressed with a control parameter for light-emitting states of all or some of LED beads or combinations of the light-emitting states. The lamp state includes one or more of the brightness, a color temperature, and a color of a lamp.

Embodiment 1

There is an embodiment of a smart lamp capable of extracting and updating a lamp state model in real time in the present invention below.

Figure 1:
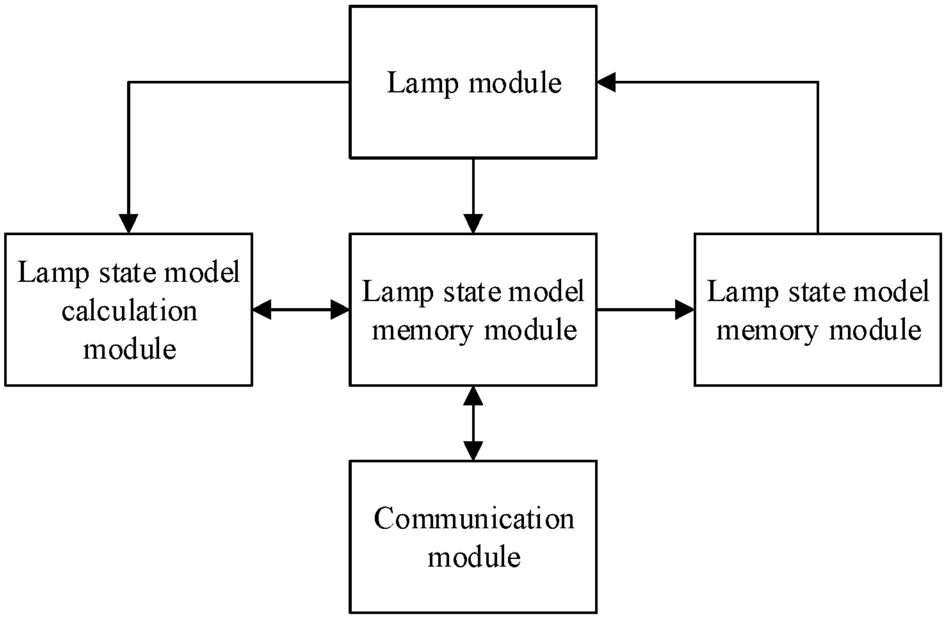
FIG. 1 is a structural block diagram of a smart lamp in the present invention.

As shown in FIG. 1, the smart lamp can extract a lamp state model locally and apply the lamp state model. The smart lamp includes a smart lamp body and a lamp module, a lamp state model memory module, a lamp state model calculation module, and a lamp state model application module that are arranged in the smart lamp body, where the lamp module is a lighting device capable of recording and controlling a lamp state, and is capable of obtaining state data for each operation or change, where the state data comprises a state value and state occurrence time;

the lamp state model memory module is configured to store the generated lamp state model, where the lamp state model includes a state value axis and a time axis, a time range of the time axis is a multiple of a cycle of a lamp state usage habit, and the state occurrence time and the time axis are absolute or relative time;

the lamp state model calculation module is configured to calculate the lamp state model; and the lamp state model application module is configured to call the lamp state model from the lamp state model memory module and to apply the lamp state.

The smart lamp further includes a communication module that can transmit the state data for the lamp and the lamp state model to other smart lamp, gateway or cloud, or download state data for other smart lamp, gateway or cloud or the lamp state model to the lamp state model memory module of the smart lamp.

The above smart lamp can predict a turn-on state of the lamp according to the lamp state model.

When the smart lamp is in the turn-on state, in the lamp state model application module, the lamp state is adjusted in real time according to the lamp state model stored in the lamp state model memory module.

The smart lamp can implement the transfer, loading, and application of the lamp state model using relative time.

Figure 2:
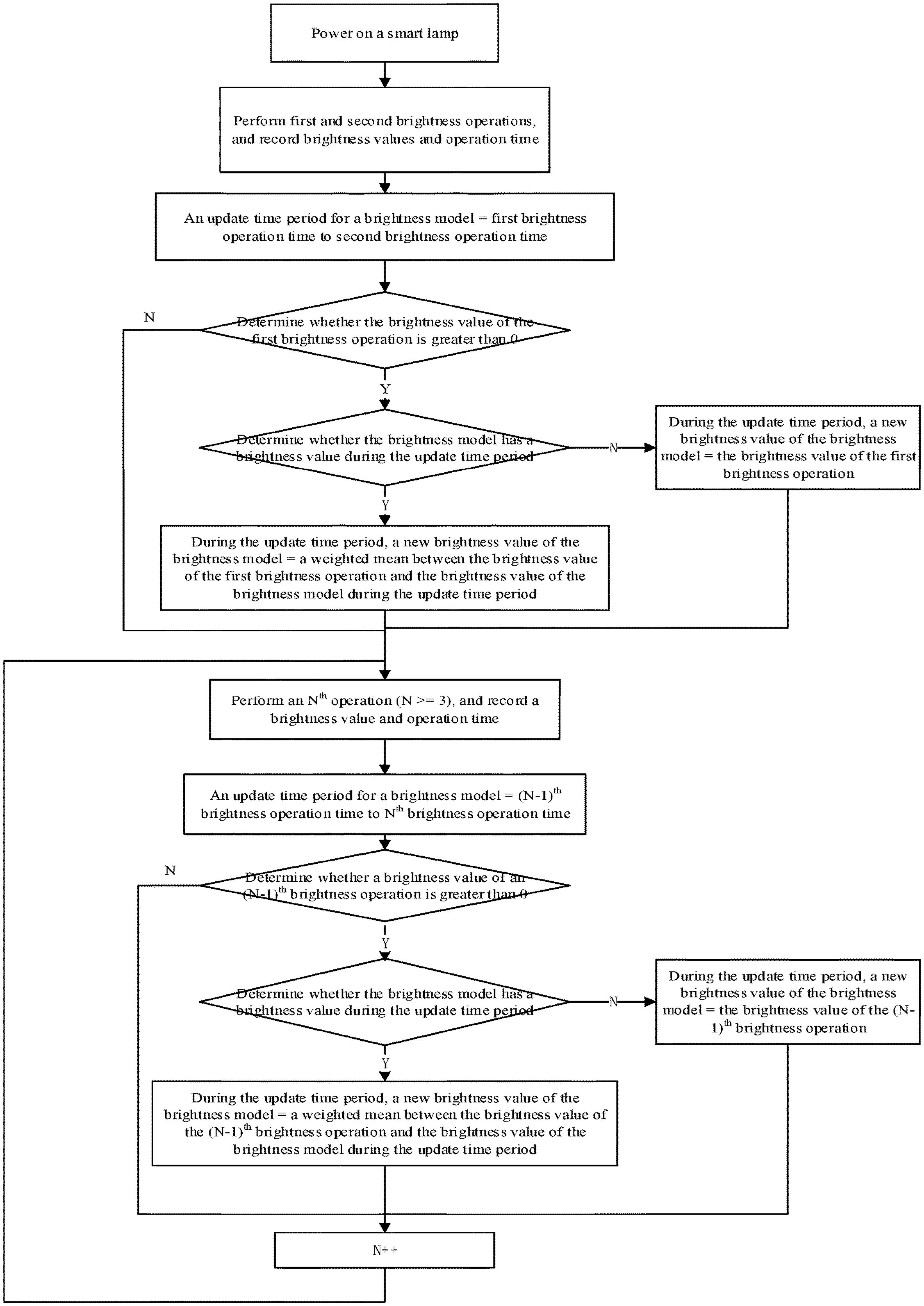
FIG. 2 is a flow chart of a method for extracting and updating a brightness model in real time in an embodiment of the present invention.

A method for calculating the lamp state model for the above smart lamp is described by taking an example of the lamp state as the brightness in conjunction with FIG. 2 below. The calculation is carried out in the lamp state model calculation module.

In S1, after the smart lamp is powered on, first and second brightness operations are performed on the smart lamp. The brightness operation includes a lamp turn-on operation, a lamp turn-off operation, and a brightness adjustment operation. The lamp state model calculation module calls brightness values and operation time for the first and second brightness operations. The brightness value is expressed with a current of an LED bead.

In S2, the smart lamp automatically performs brightness model learning on the first and second brightness operations. A brightness model for the smart lamp includes a brightness value axis and a time axis. A time range of the time axis in this embodiment is one day. A method for learning the brightness model includes:

finding an update time period for the brightness model on the time axis of the brightness model, where the update time period is a time period between the first and second brightness operations.

If a brightness value of the first brightness operation is greater than 0, the current brightness model is updated, otherwise the current brightness model is not updated.

If the brightness model is not stored or does not have a brightness value during the update time period, the brightness value of the first brightness operation is used as a new brightness value of the brightness model during the update time period. If the brightness model is already stored and has a brightness value during the update time period, a weighted mean between the brightness value of the first brightness operation and the brightness value of the stored brightness model during the update time period is calculated, where a weight ratio is 1:1. The weighted calculation result is used as the new brightness value of the brightness model during the current update time period. The updated brightness model is stored in the lamp state model memory module.

In S3, when a third brightness operation is performed on the smart lamp, the smart lamp automatically learns the second and third brightness operations to update the brightness model. A method for update includes:

finding a current update time period for the brightness model on the time axis of the brightness model, where the update time period is a time period between the second and third brightness operations.

If a brightness value of the second brightness operation is greater than 0, the current brightness model is updated, otherwise the current brightness model is not updated.

If the brightness model is not stored or does not have a brightness value during the update time period, the brightness value of the second brightness operation is used as a new brightness value of the brightness model during the update time period. If the brightness model is already stored and has a brightness value during the update time period, a weighted mean between the brightness value of the second brightness operation and the brightness value of the stored brightness model during the update time period is calculated, where a weight ratio is 1:1. The weighted calculation result is used as the new brightness value of the brightness model during the current update time period. The updated brightness model is stored in the lamp state model memory module.

In S4, according to the above method, when an $N^{th}$ brightness operation is performed on the smart lamp, the smart lamp automatically learns the $N^{th}$ brightness operation and an $(N-1)^{th}$ brightness operation to update the brightness model. A method for update includes:

finding a current update time period for the brightness model on the time axis of the brightness model, where the update time period is a time period between the $(N-1)^{th}$ and $N^{th}$ brightness operations.

If a brightness value of the $(N-1)^{th}$ brightness operation is greater than 0, the current brightness model is updated, otherwise the current brightness model is not updated.

If the brightness model is not stored or does not have a brightness value during the update time period, the brightness value of the $(N-1)^{th}$ brightness operation is used as a new brightness value of the brightness model during the update time period. If the brightness model is already stored and has a brightness value during the update time period, a weighted mean between the brightness value of the $(N-1)^{th}$ brightness operation and the brightness value of the stored brightness model during the update time period is calculated, where a weight ratio is 1:1. The weighted calculation result is used as the new brightness value of the brightness model during the time period between the $(N-1)^{th}$ and $N^{th}$ brightness operations. The updated brightness model is stored in the lamp state model memory module.

The cycle of the lamp state usage habit may also be one week, one month, or other habit cycle.

Embodiment 2

A method for turning on a smart lamp in the present invention is described by taking an example where the smart lamp is turned on according to a brightness model below.

A brightness model is stored in the smart lamp and includes a brightness value axis and a time axis. A time range of the time axis is one day.

When a lamp turn-on operation is performed, the smart lamp automatically queries a time point for a current lamp turn-on operation time on the time axis of the brightness model, where a brightness value corresponding to this time point of the brightness model is a brightness prediction result for the current lamp turn-on operation. The smart lamp is turned on or gradually turned on based on the brightness prediction result.

If the brightness prediction result for the current lamp turn-on operation is not obtained or is zero, the smart lamp is turned on or gradually turned on by using a non-zero brightness value closest to the current lamp turn-on operation time on the brightness model.

The brightness prediction result may also be predicted in combination with lamp turn-on time, a state of the lamp before the current lamp turn-on operation, a prediction result of a model in other state in the current lamp, a current state of other associated sensor, current user setting information, etc.

When the turn-on brightness automatically predicted by the smart lamp does not meet the requirement of a user, the user may change the brightness of the lamp by a brightness adjustment device of the smart lamp, such as a switch and an APP. The smart lamp may learn a current new brightness adjustment operation during a next brightness operation, so as to further update the brightness model. A method for updating the brightness model includes:

finding an update time period for the brightness model on the time axis of the brightness model, where the update time period is a time period between the current brightness operation and the next brightness operation. A weighted mean between a current brightness value of the brightness model during the update time period and a brightness value of the brightness model is calculated, where a weight ratio is 1:1. The weighted calculation result is used as a new brightness value of the brightness model during the update time period.

Embodiment 3

A method for transferring, loading, and applying a lamp state model using relative time in the present invention is described by taking an example where a brightness model with relative time is transferred, loaded, and applied below.

Figure 3:
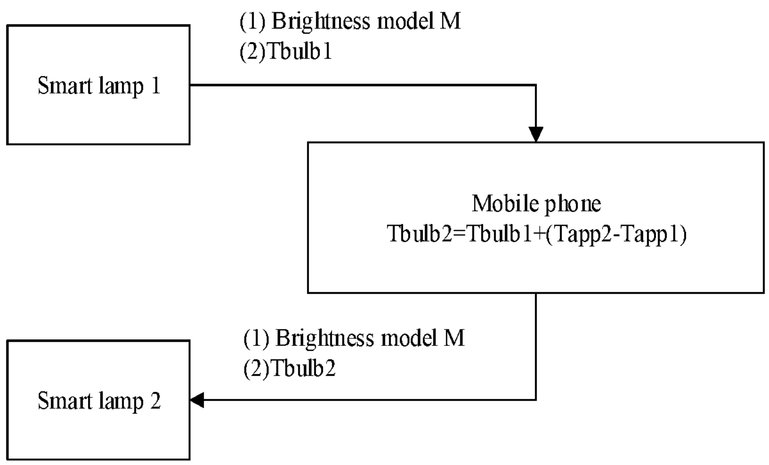
FIG. 3 is a block diagram of transferring and loading a brightness model using relative time in an embodiment of the present invention, with an example where a time point Tbulb2 for a loading time on a brightness model M is calculated on a mobile phone.

Referring to FIG. 3, a brightness model M generated in a smart lamp 1 and using relative time is loaded into a smart lamp 2 using relative time for application. The smart lamp 1 and the smart lamp 2 use respective power-on times as zero times of the relative time thereof.

The smart lamp 1 is a transferred device A; a mobile phone is a storage device B; and the smart lamp 2 is a target application device C. The smart lamp 1 and the smart lamp 2 are wirelessly connected to the mobile phone, respectively.

The smart lamp 1 performs learning based on the method in Embodiment 1 to generate the brightness model M of the smart lamp 1. The zero time for the brightness model M is the power-on time for the smart lamp 1.

A mobile APP is operated to transfer the brightness model M of the smart lamp 1 to the mobile phone. Stored content of the mobile phone includes the brightness model M for the smart lamp 1, a corresponding time point $T_{bulb1}$ on the brightness model M for a transfer time, and a corresponding time point $T_{app1}$ on the mobile phone for the transfer time.

The mobile APP is operated to load the brightness model M for the smart lamp 1 that is stored in the mobile phone into the smart lamp 2. Loaded content includes the brightness model M for the smart lamp 1 and a time point $T_{bulb2}$ on the brightness model M for a loading time. During loading, the time point $T_{bulb2}$ is first calculated on the mobile phone according to the following formula:

$$T_{bulb2}=T_{bulb1}+(T_{app2}-T_{app1})$$

where $T_{bulb1}$ is the corresponding time point on the brightness model M for the transfer time, when the brightness model M is transferred from the smart lamp 1 to the mobile phone; $T_{app1}$ is the corresponding time point on the mobile phone for the transfer time, when the brightness model M is transferred from the smart lamp 1 to the mobile phone; and $T_{app2}$ is a corresponding time point on the mobile phone for a loading time, when the brightness model M is loaded from the mobile phone to the smart lamp 2.

When the newly loaded brightness model M is applied to the smart lamp 2, a time axis correction value AxisDis needs to be first calculated, where $$AxisDis=T_{bulb2}-ST0$$

where $T_{bulb2}$ is the corresponding time point on the brightness model M for the loading time; and ST0 is a corresponding system time point on the smart lamp 2 for the loading time.

Real-time system time ST of the smart lamp 2 is converted to a time axis of the brightness model M, and a converted real-time system time ST' is calculated by the following formula:

$$ST'=ST+AxisDis.$$

When the newly loaded brightness model M is applied to the smart lamp 2, a brightness value is indexed by using the converted real-time system time ST'.

In the above embodiment, when the brightness model M stored in the mobile phone is loaded to the smart lamp 2, the corresponding time point $T_{bulb2}$ on the brightness model M for the loading time can be calculated on both the mobile phone and the smart lamp 2.

Figure 4:
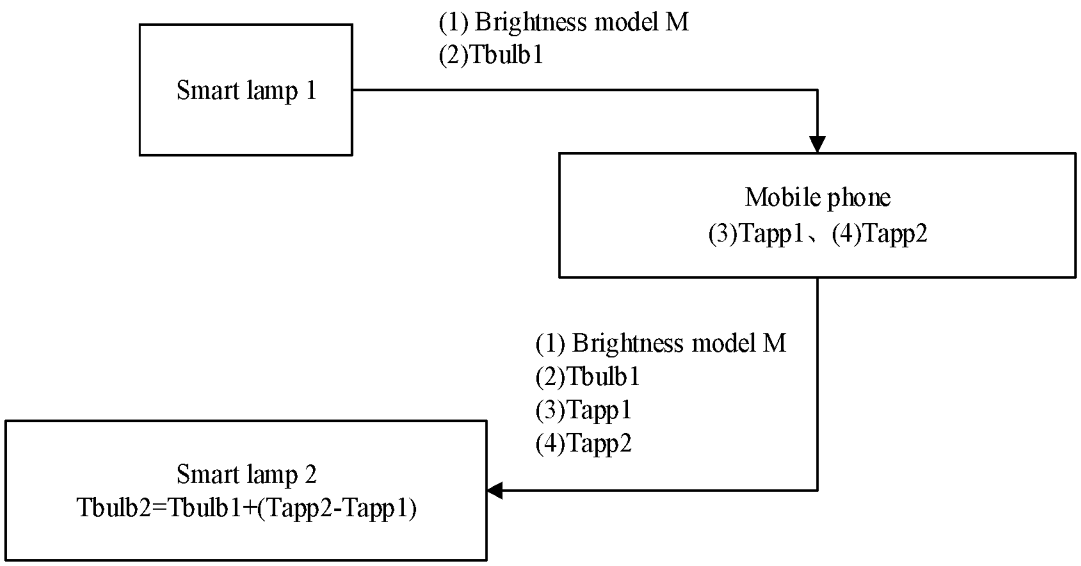
FIG. 4 is a block diagram of transferring and loading a brightness model using relative time in an embodiment of the present invention, with an example where a time point Tbulb2 for a loading time on a brightness model M is calculated on a smart lamp 2.

Referring to FIG. 4, methods for loading and calculation include:

operating the mobile APP to load the brightness model M for the smart lamp 1 that is stored in the mobile phone into the smart lamp 2. The loaded content includes the brightness model M for the smart lamp 1, the corresponding time point $T_{bulb1}$ on the lamp state model for the transfer time, the corresponding time point $T_{app1}$ on the mobile phone for the transfer time, and the corresponding time point $T_{app2}$ on the mobile phone for the loading time.

During loading, the corresponding time point $T_{bulb2}$ on the brightness model M for the loading time can be calculated on the smart lamp 2 according to the following formula:

$$T_{bulb2}=T_{bulb1}+(T_{app2}-T_{app1}).$$

The above method for transferring, loading, and applying a lamp state model using relative time is further applicable to the transfer, loading, and application of a lamp turn-on or turn-off habit model using relative time. The lamp turn-on or turn-off habit model includes a turn-on or turn-off frequency axis and a time axis. A time range of the time axis is one day.

What is claimed is:

1. A method for transferring, loading, and applying a lamp state model using relative time, comprising the following steps:

s1: connecting a transferred device to a storage device in a first wired or wireless manner;

s2: manually or automatically transferring the lamp state model from the transferred device to the storage device, and a transferred content comprises:

(1) the lamp state model;

(2) a corresponding time point Tbulb1 on the lamp state model for a transfer time; and (3) a corresponding time point Tapp1 on the storage device for the transfer time;

s3: connecting the storage device to a target application device in a second wired or wireless manner;

s4: manually or automatically loading the lamp state model from the storage device to the target application device, and the loaded content comprises:

(1) the lamp state model, and (2) a corresponding time point Tbulb2 on the lamp state model for a loading time, wherein the corresponding time point Tbulb2 on the lamp state model for the loading time is calculated by the following formula on the storage device via (a) the corresponding time point Tbulb1 on the lamp state model for the transfer time, (b) the corresponding time point Tapp1 on the storage device for the transfer time, and (c) a corresponding time point Tapp2 on the storage device for the loading time:

Tbulb2=Tbulb1+(Tapp2−Tapp1);

or the loaded content comprises:

(1) the lamp state model, (2) the corresponding time point Tbulb1 on the lamp state model for the transfer time, (3) the corresponding time point Tapp1 on the storage device for the transfer time, and (4) a corresponding time point Tapp2 on the storage device for a loading time, wherein the corresponding time point Tbulb2 on the lamp state model for the loading time is calculated by the following formula on the target application device via (1) the corresponding time point Tbulb1 on the lamp state model for the transfer time, (2) the corresponding time point Tapp1 on the storage device for the transfer time, and (3) the corresponding time point Tapp2 on the storage device for the loading time:

Tbulb2=Tbulb1+(Tapp2−Tapp1);

s5: applying a newly loaded lamp state model to the target application device, wherein the transferred device and the target application device are smart lamps configured to store and apply the lamp state model with the relative time; and s6: a lamp turn-on operation is performed on the target application device by turning on the target application device according to the newly loaded lamp state model, comprising the following steps:

s61) finding a time point for a current lamp turn-on operation on the time axis of the lamp state model;

s62) obtaining a predicted state of the current lamp turn-on operation according to a state value of the lamp state model at the time point, and when a predicted result of a current lamp turn-on state is not obtained or is zero, using a non-zero state value closest to current lamp turn-on time on the lamp state model; and s63) turning on or gradually turning on, according to the predicted state of the current lamp turn-on state, the target application device to be in the predicted state.

2. The method according to claim 1, wherein in step s5, applying the newly loaded lamp state model comprises the following steps:

s51: when the lamp state model is loaded, calculating a deviation AxisDis between the corresponding time point Tbulb2 on the lamp state model for the loading time and a corresponding system time point ST0 on the target application device for the loading time, wherein AxisDis=Tbulb2−ST0;

s52: converting real-time system time ST of the target application device to a time axis of the lamp state model, wherein converted real-time system time ST'=ST+AxisDis; and s53: when the lamp state model is applied, indexing a state value of the lamp state model by using the converted real-time system time ST'.

3. The method according to claim 1, wherein the storage device is a terminal device, a local server, or a cloud server with a storage capacity.

4. The method according to claim 1, wherein in the transferred content in step s2, (1) the lamp state model uses the relative time; (2) the corresponding time point Tbulb1 on the lamp state model for the transfer time is obtained from the transferred device; and (3) the corresponding time point Tapp1 on the storage device for the transfer time is obtained from the storage device.

* * * * *